US012185075B1

(12) United States Patent
Deng et al.

(10) Patent No.: US 12,185,075 B1
(45) Date of Patent: Dec. 31, 2024

(54) MINIATURE LOUDSPEAKER WITH RADIAL RING MAGNETIC CIRCUIT

(71) Applicant: TIINLAB CORPORATION, Shenzhen (CN)

(72) Inventors: Xiaolin Deng, Shenzhen (CN); Shihchia Chiu, Shenzhen (CN)

(73) Assignee: TIINLAB CORPORATION, Shenzhen (CN)

( * ) Notice: Subject to any disclaimer, the term of this patent is extended or adjusted under 35 U.S.C. 154(b) by 0 days.

(21) Appl. No.: 18/735,205

(22) Filed: Jun. 6, 2024

(30) Foreign Application Priority Data

Jun. 7, 2023 (CN) ........................ 202310671775.0

(51) Int. Cl.

*H04R 9/06* (2006.01)
*H04R 1/02* (2006.01)
*H04R 7/12* (2006.01)
*H04R 7/18* (2006.01)
*H04R 9/02* (2006.01)
*H04R 9/04* (2006.01)

(52) U.S. Cl.

CPC ............ *H04R 9/025* (2013.01); *H04R 1/023* (2013.01); *H04R 1/025* (2013.01); *H04R 7/127* (2013.01); *H04R 7/18* (2013.01); *H04R 9/045* (2013.01); *H04R 9/046* (2013.01); *H04R 9/06* (2013.01); *H04R 2209/026* (2013.01)

(58) Field of Classification Search

CPC .......... H04R 1/023; H04R 1/025; H04R 1/24; H04R 1/2819; H04R 1/2849; H04R 7/127; H04R 9/025; H04R 9/045; H04R 9/046; H04R 9/06; H04R 9/063; H04R 2209/024; H04R 2209/026; H04R 2400/11

See application file for complete search history.

(56) References Cited

U.S. PATENT DOCUMENTS

| | | | | |
|---|---|---|---|---|
| 5,604,815 A * | 2/1997 | Paddock | ................ | H04R 9/047 381/396 |
| 11,395,060 B2 * | 7/2022 | Ji | ............................ | H04R 7/06 |
| 2002/0168074 A1 * | 11/2002 | Miyamoto | ............... | H04R 9/10 381/182 |

* cited by examiner

*Primary Examiner* — Huyen D Le

(74) *Attorney, Agent, or Firm* — Andrew C. Cheng

(57) ABSTRACT

A miniature loudspeaker includes an outer shell, a magnetic circuit assembly including an inner-ring magnetic circuit unit and an outer-ring magnetic circuit unit with an annular gap formed therebetween, a voice coil and a diaphragm. The outer shell is provided with a positioning column which defines a hollow channel, and a hollow tuning hole is defined in the bottom of the outer shell corresponding to the hollow channel. Multiple circumferential tuning holes are defined at the bottom of the outer shell and communicated with the annular gap to form a tuning channel. The voice coil includes a winding located in the annular gap and between the middle magnets of the inner-ring magnetic circuit unit and the outer-ring magnetic circuit unit. The hollow channel directly faces the diaphragm and forms another tuning channel together with the diaphragm.

10 Claims, 8 Drawing Sheets

MINIATURE LOUDSPEAKER WITH RADIAL RING MAGNETIC CIRCUIT

FIELD

The invention relates to the technical field of loudspeakers and, in particular, to a miniature loudspeaker with a radial ring magnetic circuit.

BACKGROUND

As is commonly known, a loudspeaker is a sound-generating device that converts electrical signals into audio signals. With the trend of electronic devices becoming thinner, lighter, and smaller, loudspeakers used in electronic devices accordingly require miniaturized designs.

FIG. 7 shows a loudspeaker with a conventional magnetic circuit in traditional technologies. This kind of common miniature loudspeaker generally comprises an iron shell 50, as well as a magnet 60, a washer/magnetic conductive plate 70, a voice coil 30 and a diaphragm 80 that are installed in the iron shell 50. The washer 70 is installed above the magnet 60, an upper end of the voice coil 30 is connected with the diaphragm 80, a lower part of the voice coil 30 extends into a gap between the washer 70 and the iron shell 50. A tuning hole 51 is defined at the bottom of the iron shell 50 between the magnet 60 and a magnetic conductive frame. Magnetic field lines generated by the magnet 60 appear in the above-mentioned gap via the washer 70, and then enter the magnetic conductive frame again and return to the magnet 60 to form a magnetic circuit. This kind of magnetic circuit structure is relatively simple and prone to distortion caused by magnetic field eddy current. Moreover, since the position of the tuning hole affects the overall internal structure, the sizes of the magnet 60 and the voice coil 30 cannot be increased, making it difficult to improve the sensitivity of the loudspeaker. In the meanwhile, since a circuit board of this miniature loudspeaker is glued to the iron shell, the gluing operation is time-consuming and labor-intensive and the circuit board is more likely to fall off, which obviously cannot meet market requirements.

Therefore, a new technical solution is desired to solve the above problems.

SUMMARY

The technical issue that the present invention aims to resolve is to provide, in view of the drawback that the prior art suffers, an improved miniature loudspeaker which can increase the sizes of the magnetic circuit and the voice coil effectively, increase the BL value of the loudspeaker, and improve the frequency response characteristics, thereby improving the sensitivity of the loudspeaker and producing a good sound effect.

The technical solution that the present invention adopts to resolve the technical issues is to provide a miniature loudspeaker which comprises an outer shell, a magnetic circuit, a voice coil and a diaphragm, the outer shell comprising a bottom and an outer ring wall, the bottom and the outer ring wall cooperatively forming a receiving cavity, the diaphragm, the voice coil and the magnetic circuit being installed in the receiving cavity of the outer shell. The diaphragm comprises a dome, a connecting portion, a folding ring, and an outer ring portion that are connected in sequence from an inside to an outside, the voice coil is connected to the connecting portion, the diaphragm is fixed to the outer shell by means of the outer ring portion, a ratio of an inner diameter of the dome to an inner diameter of the diaphragm is between 50% and 60%, and a height of the folding ring is between 0.4 mm and 0.5 mm. The bottom of the outer shell is provided with a positioning column that protrudes upward and is located in the receiving cavity; the positioning column is provided with a hollow channel extending through the bottom of the outer shell, a hollow tuning hole is provided at the bottom of the outer shell corresponding to the hollow channel, the hollow tuning hole is in communication with the hollow channel, a plurality of circumferential tuning holes are provided at the bottom of the outer shell along an outer periphery of the hollow tuning hole and penetrate the bottom of the outer shell. The magnetic circuit comprises an inner-ring magnetic circuit unit and an outer-ring magnetic circuit unit, the inner-ring magnetic circuit unit has an inner-ring hole, the outer-ring magnetic circuit unit has an outer-ring hole, the inner-ring magnetic circuit unit is sleeved on the positioning column through the inner-ring hole, the outer-ring magnetic circuit unit is sleeved outside the inner-ring magnetic circuit unit through the outer-ring hole, and an annular gap is formed between an outer wall of the inner-ring magnetic circuit unit and an inner wall of the outer-ring magnetic circuit unit. The inner-ring magnetic circuit unit comprises an upper inner magnetic ring, a middle inner magnetic ring and a lower inner magnetic ring that are stacked up in sequence, the outer-ring magnetic circuit unit comprises an upper outer magnetic ring, a middle outer magnetic ring and a lower outer magnetic ring that are stacked up in sequence; the upper inner magnetic ring, the lower inner magnetic ring, the upper outer magnetic ring and the lower outer magnetic ring are polarized axially, and the middle inner magnetic ring and the middle outer magnetic ring are radially polarized. The upper outer magnetic ring, the upper inner magnetic ring, the middle inner magnetic ring, and the middle outer magnetic ring form a closed magnetic circuit, the lower outer magnetic ring, the lower inner magnetic ring, the middle inner magnetic ring and the middle outer magnetic ring form another closed magnetic circuit; the circumferential tuning holes in communication with the annular gap directly face the annular gap to form tuning channels. The voice coil is installed in the annular gap; the voice coil comprises a hollow tube and a winding wound around the hollow tube; the winding is located in the annular gap; the diaphragm is installed above the voice coil and connected with a top of the hollow tube; and the hollow channel directly faces the diaphragm and forms another tuning channel together with the diaphragm.

Preferably, the winding is located in a portion of the annular gap between the middle inner magnetic ring and the middle outer magnetic ring, and a height of the winding is less than or equal to thicknesses of the middle inner magnetic ring and the middle outer magnetic ring.

Preferably, polarities of magnetic poles at one ends of the upper outer magnetic ring and the lower outer magnetic ring close to the middle outer magnetic ring are the same; polarities of magnetic poles at one ends of the upper inner magnetic ring and the lower inner magnetic ring close to the middle inner magnetic ring are the same; polarities of magnetic poles at one ends of the upper outer magnetic ring and the upper inner magnetic ring close to the diaphragm are reverse to each other; polarities of magnetic poles at one ends of the middle outer magnetic ring and the middle inner magnetic ring close to the voice coil are reverse to each other; and a polarity of a magnetic pole at one end of the upper outer magnetic ring close to the diaphragm is reverse to a polarity of a magnetic pole at one end of the middle outer magnetic ring close to the voice coil.

Preferably, the upper inner magnetic ring, the middle inner magnetic ring, and the lower inner magnetic ring are configured as an integrally closed annular structure; and the upper outer magnetic ring, the middle outer magnetic ring and the lower outer magnetic ring are configured as an integrally closed annular structure.

Preferably, a remanence of the upper inner magnetic ring and a remanence of the lower inner magnetic ring are respectively less than a remanence of the middle inner magnetic ring, and a superimposed remanence of the upper inner magnetic ring and the lower inner magnetic ring is greater than the remanence of the middle inner magnetic ring; and a remanence of the upper outer magnetic ring and a remanence of the lower outer magnetic ring are respectively less than the remanence of the middle outer magnetic ring, and a superimposed remanence of the upper outer magnetic ring and the lower outer magnetic ring is greater than the remanence of the middle outer magnetic ring.

Preferably, the outer shell is provided with a solder pad, and the outer shell is formed by integrally injection-molding with the solder pad.

Preferably, the annular gap has a radial width of 0.4 mm-1.0 mm.

Preferably, an inner diameter of the inner-ring magnetic circuit unit ranges from 2.5 mm to 3.5 mm.

Preferably, a first tuning mesh is provided at the bottom of the outer shell corresponding to the hollow tuning hole; and a second tuning mesh is provided at the bottom of the outer shell corresponding to each of the circumferential toning holes.

Preferably, a ratio of a radial thickness of the inner-ring magnetic circuit unit to a radial thickness of the outer-ring magnetic circuit unit is between ⅔ and 1.

Compared with the prior art, the invention has obvious advantages and beneficial effects. Specifically, as shown in the above technical solution, the inner-ring magnetic circuit unit and the outer-ring magnetic circuit unit cooperatively form a radial ring magnetic circuit, the winding of the voice coil extends into an annular gap between the inner-ring magnetic circuit unit and the outer-ring magnetic circuit unit, and circumferential tuning holes are connected to the annular gap and directly face the annular gap to form a tuning channel; a hollow channel directly faces the diaphragm and forms another tuning channel together with the diaphragm. The tuning channels are respectively designed in the positioning column on which the inner-ring magnetic circuit unit is sleeved and in a position corresponding to the annular gap between the inner-ring magnetic circuit unit and the outer-ring magnetic circuit unit. In this way, in a loudspeaker with the same outer diameter, the sizes of the magnetic circuit and the voice coil can be increased effectively, the BL value of the loudspeaker is increased, and the frequency response characteristics are improved, thereby improving the sensitivity of the loudspeaker and producing a good sound effect.

In addition, the voice coil is connected to the connecting portion, and the diaphragm is fixed to an outer shell by means of an outer ring portion; a ratio of an inner diameter of the dome to an inner diameter of the diaphragm is between 50% and 60%, and a height of a folding ring is between 0.4 mm and 0.5 mm. In this way, the loudspeaker has a resonant frequency of 180-250 Hz with a high frequency up to 30 KHz, thereby achieving a good sound effect at both a high frequency and a low frequency within a range of 20 Hz to 20 KHz.

In order to illustrate the structural features and effects of the invention more clearly, the invention will be described in detail below with reference to the accompanying drawings and specific embodiments.

Figure 1:
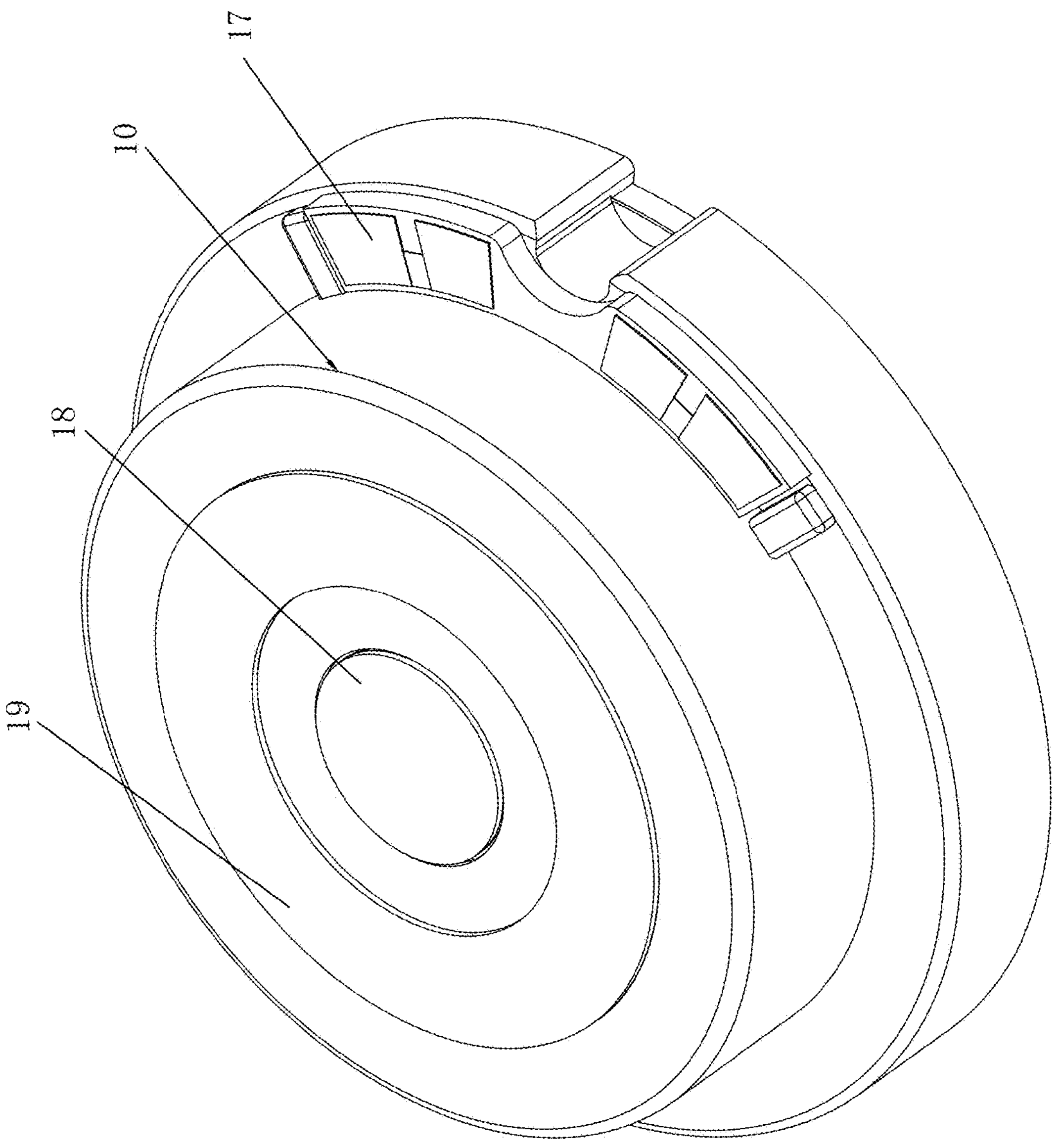
FIG. 1 is a perspective view of a loudspeaker according to an embodiment of the invention.
Figure 2:
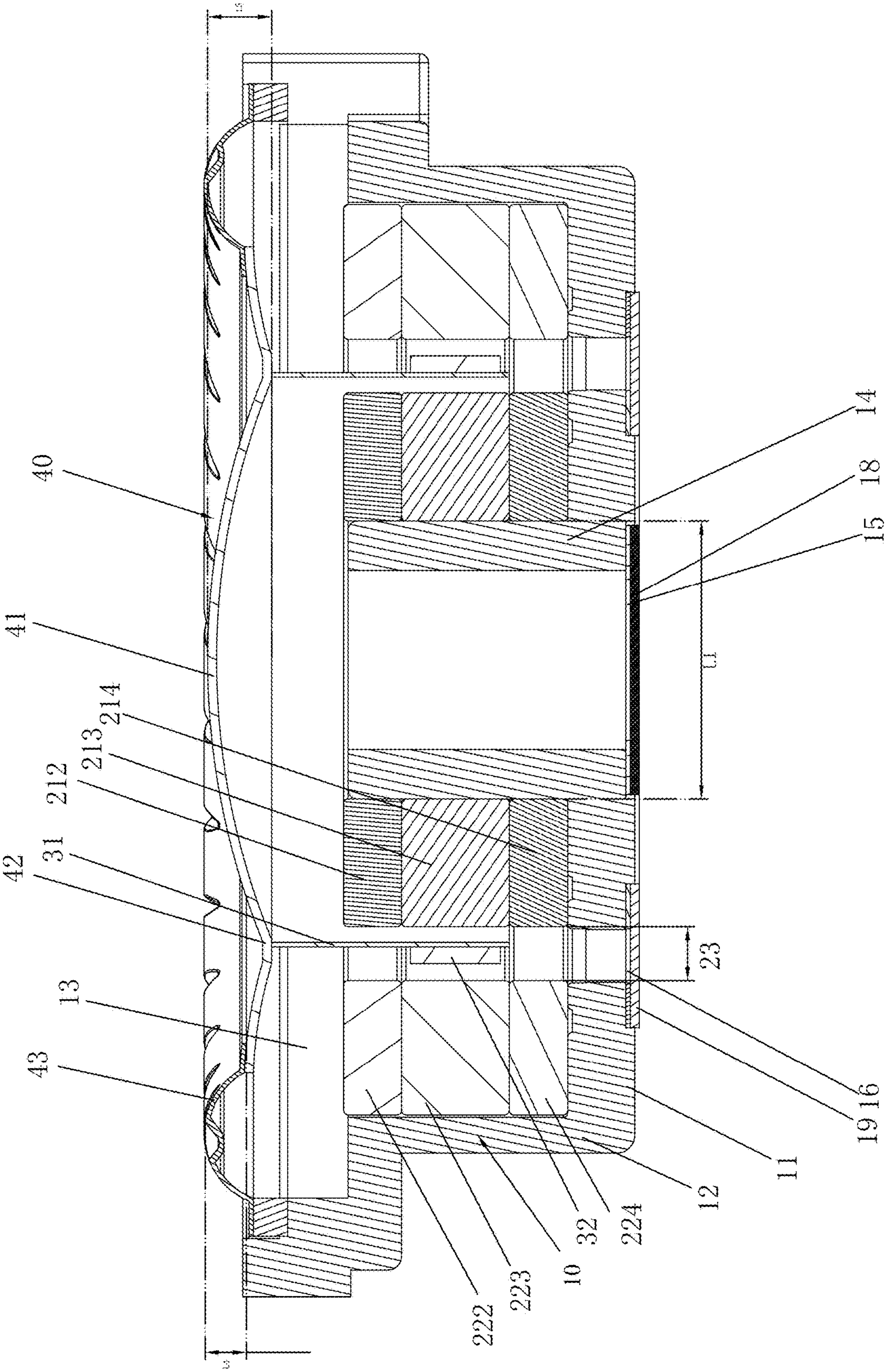
FIG. 2 is a cross-sectional view of FIG. 1.
Figure 3:
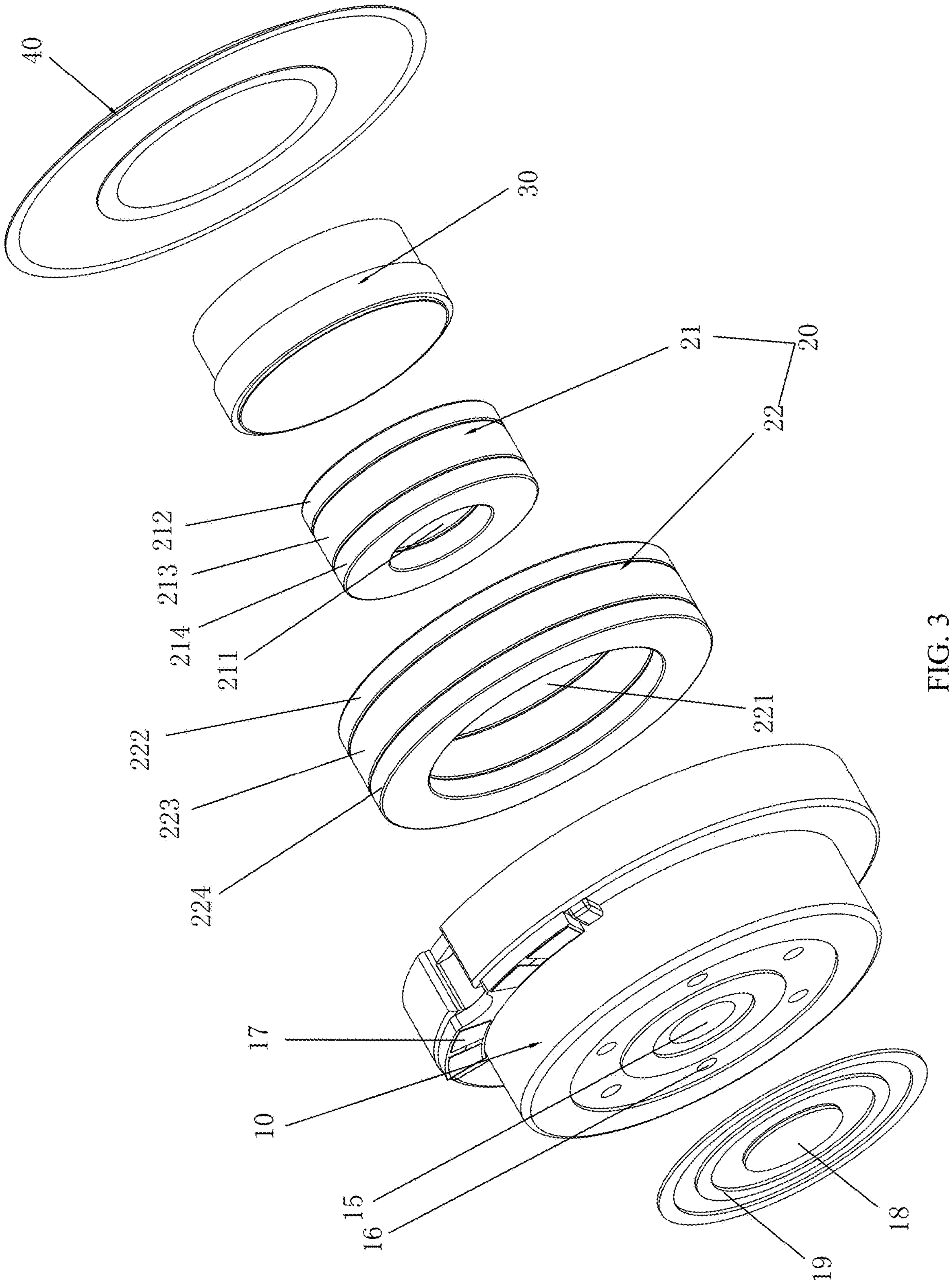
FIG. 3 is an exploded view of FIG. 1.

Reference numerals:

| | |
|---|---|
| 10. outer shell | 11. bottom |
| 12. outer ring wall | 13. receiving cavity |
| 14. positioning column | 15. hollow tuning hole |
| 16. circumferential tuning hole | 17. binding pad |
| 18. first tuning mesh | 19. second tuning mesh |
| 20. magnetic circuit | 22. outer-ring magnetic circuit unit |
| 21. inner-ring magnetic circuit unit | 212. upper inner magnetic ring |
| 211. inner-ring hole | 214. lower inner magnetic ring |
| 213. middle inner magnetic ring | 222. upper outer magnetic ring |
| 221. outer-ring hole | 224. lower outer magnetic ring |
| 223. middle outer magnetic ring | 30. voice coil |
| 23. annular gap | 32. roll |
| 31. hollow tube | 50. iron shell |
| 40. diaphragm | 42. connecting portion |
| 41. dome | 44. outer ring portion |
| 43. folding ring | 70. washer |
| 60. magnet | 51. tuning hole |
| 80. vibrating diaphragm | d2. radial thickness of inner-ring magnetic circuit unit |
| L1. inner diameter of inner-ring magnetic circuit unit | L4. height of folding ring |
| d1. radial thickness of outer-ring magnetic circuit unit | L6. inner diameter of dome |
| L5. height of dome | d4. outer diameter of inner-ring magnetic circuit unit |
| L7. inner diameter of diaphragm | |
| d5. outer diameter of outer-ring magnetic circuit unit | |

DESCRIPTION OF THE EMBODIMENTS

In the description of the invention, it should be noted that orientations or positional relationships, indicated by the terms, such as "upper", "lower", "front", "rear", "left", "right", are based on the orientations or positional relationships shown in the drawings or when worn and used normally. The positional relationships are only for the convenience of describing the invention and simplifying the description, rather than indicating or implying that the device or element referred to must have a specific orientation or be constructed and operated in a specific orientation, so they cannot be construed as limiting the invention.

FIG. 1 to FIG. 8 show the specific structure of a miniature loudspeaker in accordance with an embodiment of the invention. The miniature loudspeaker with a radial ring magnetic circuit comprises an outer shell 10, a magnetic circuit assembly 20, a voice coil 30, and a diaphragm 40.

The outer shell 10 comprises a bottom 11 and an outer ring wall 12. The bottom 11 and the outer ring wall 12 cooperatively form a receiving cavity 13. The diaphragm 40, the voice coil 30 and the magnetic circuit assembly 20 are installed in the receiving cavity 13 of the outer shell 10. The bottom 11 of the outer shell 10 is provided with a positioning column 14 that protrudes upward and is located in the receiving cavity 13. The positioning column 14 defines a hollow channel extending through the bottom 11 of the outer shell 10. A hollow tuning hole 15 is provided at the bottom 11 of the outer shell 10 corresponding to the hollow channel; the hollow tuning hole 15 is in communication with the hollow channel. A plurality of circumferential tuning holes 16 are provided at the bottom 11 of the outer shell 10 along an outer periphery of the hollow tuning hole 15 and extend through the bottom 11 of the outer shell 10. The circumferential tuning holes 16 are in communication with an annular gap 23 and directly face the annular gap 23 to form a tuning channel. The hollow tuning hole 15 directly faces the diaphragm 40 to form another tuning channel. Compared with a traditional loudspeaker with the same outer diameter, the loudspeaker of the present invention comprises tuning channels provided at the center of an inner magnetic ring and at the annular gap, which can effectively increase the sizes of the magnetic circuit and the voice coil, increase the BL value of the loudspeaker and improve the frequency response characteristics, thereby improving the sensitivity of the loudspeaker and producing a good sound effect.

Preferably, the outer shell 10 is provided with a solder pad 17 which is integrally injection molded with the outer shell 10, which solves the problem of abnormality when a PCB is bonded to a conventional loudspeaker shell and the process of bonding the PCB is omitted, thereby reducing the labor costs of production. Preferably, a first tuning mesh 18 and a second tuning mesh 19 are provided at the bottom 11 of the outer shell 10 corresponding to the hollow tuning hole 15 and the circumferential toning holes 16 respectively. The first tuning mesh 18 is covered on one side of the hollow tuning hole 15 away from the positioning column 14. The second tuning mesh 19 is covered on one side of the circumferential toning holes 16 away from the diaphragm 40.

A top end of the outer ring wall 12 of the outer shell 10 is also provided with a recessed annular positioning groove. The miniature loudspeaker further comprises a copper ring, and an outer ring portion of the diaphragm 40 is fixed in the annular positioning groove by virtue of the copper ring.

The magnetic circuit assembly 20 comprises an inner-ring magnetic circuit unit 21 and an outer-ring magnetic circuit unit 22. Preferably, an inner diameter L1 of the inner-ring magnetic circuit unit ranges from 2.5 mm to 3.5 mm. Preferably, a ratio of a radial thickness d2 of the inner-ring magnetic circuit unit 21 to a radial thickness d1 of the outer-ring magnetic circuit unit 22 is between ⅔ and 1, thereby avoiding leakage magnetic flux. The inner-ring magnetic circuit unit 21 has an inner-ring hole 211 and the outer-ring magnetic circuit unit 22 has an outer-ring hole 221. The inner-ring magnetic circuit unit 21 is sleeved on the positioning column 14 through the inner-ring hole 211, the outer-ring magnetic circuit unit 22 is sleeved outside the inner-ring magnetic circuit unit 21 through the outer-ring hole 221, and an outer wall of the inner-ring magnetic circuit unit 21 and an inner wall of the outer-ring magnetic circuit unit 22 form the annular gap 23.

The hollow channel of the positioning column 14 directly faces the diaphragm 40 to thereby form another tuning channel together with the diaphragm 40. The annular gap 23 has a width of 0.4 mm-1.0 mm. When the material brand of the inner-ring magnetic circuit unit 21 and the outer-ring magnetic circuit unit 22 is N52, the width of the annular gap 23 between the inner-ring magnetic circuit unit 21 and the outer-ring magnetic circuit unit 22 is 0.4 mm, with a BL value (that is, the magnetic force value, which is the product of the magnetic flux density B and the length L of the voice coil wire) of 1.4006. When the material brand of the inner-ring magnetic circuit unit 21 and the outer-ring magnetic circuit unit 22 is N52, the width of the annular gap 23 between the inner-ring magnetic circuit unit 21 and the outer-ring magnetic circuit unit 22 is 0.7 mm, with a BL value of 1.0792. When the material brand of the inner-ring magnetic circuit unit 21 and the outer-ring magnetic circuit unit 22 is N52, the width of the annular gap 23 between the inner-ring magnetic circuit unit 21 and the outer-ring magnetic circuit unit 22 is 1.0 mm, with a BL value of 0.82816. In this embodiment, the BL values generated by different annular gaps between the inner-ring magnetic circuit unit 21 and the outer-ring magnetic circuit unit 22 are simulated through Comsol software. The Comsol software is well known to those in the art and will not be described in detail here.

Preferably, the inner-ring magnetic circuit unit 21 comprises an upper inner magnetic ring 212, a middle inner magnetic ring 213 and a lower inner magnetic ring 214 that are stacked up in sequence. The outer-ring magnetic circuit unit 22 comprises an upper outer magnetic ring 222, a middle outer magnetic ring 223 and a lower outer magnetic ring 224 that are stacked up in sequence. The upper outer magnetic ring 222, the upper inner magnetic ring 212, the middle inner magnetic ring 213, and the middle outer magnetic ring 223 cooperatively form a closed magnetic circuit. The lower outer magnetic ring 224, the lower inner magnetic ring 214, the middle inner magnetic ring 213, and the middle outer magnetic ring 223 cooperatively form a closed magnetic circuit.

Magnetic poles at one ends of the upper outer magnetic ring 222 and the lower outer magnetic ring 224 close to the middle outer magnetic ring 223 are the same polarity. Magnetic poles at one ends of the upper inner magnetic ring 212 and the lower inner magnetic ring 214 close to the middle inner magnetic ring 213 are the same polarity. Polarities of magnetic poles at one ends of the upper outer magnetic ring 222 and the upper inner magnetic ring 212 close to the diaphragm 40 are reverse to each other.

Polarities of magnetic poles at one ends of the middle outer magnetic ring 223 and the middle inner magnetic ring 213 close to the voice coil 30 are reverse to each other. The polarity of a magnetic pole at one end of the upper outer magnetic ring 222 close to the diaphragm and the polarity of a magnetic pole at one end of the middle outer magnetic ring 223 close to the voice coil 30 are reverse to each other.

Figure 4:
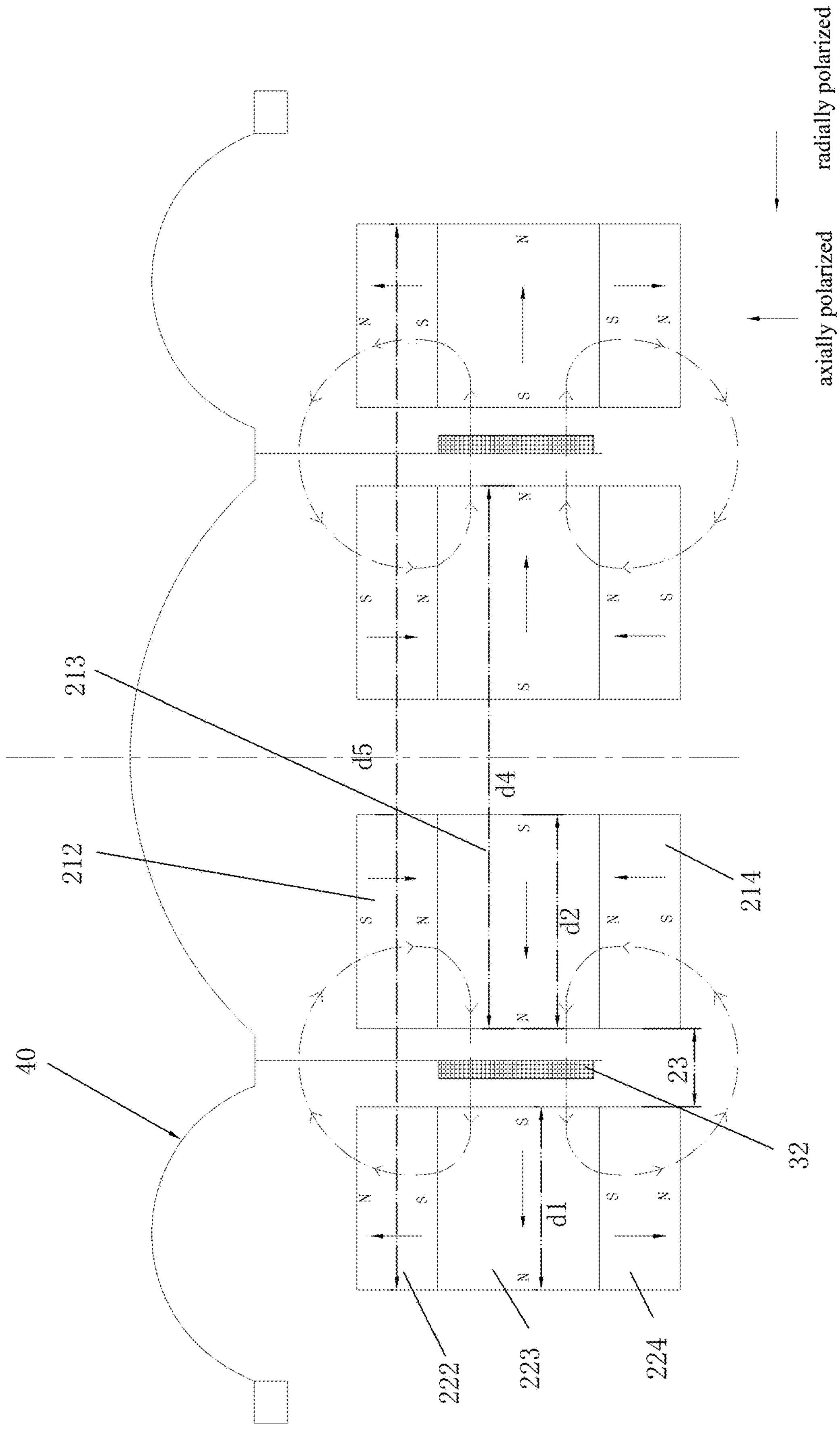
FIG. 4 illustrates closed magnetic flux circuits in an axial cross section of the loudspeaker of FIG. 1.

As shown in FIG. 4, the magnetic poles at one ends of the upper outer magnetic ring 222 and the lower outer magnetic ring 224 adjacent to the middle outer magnetic ring 223 are S-poles. The magnetic poles at one ends of the upper inner magnetic ring 212 and the lower inner magnetic ring 214 adjacent to the middle inner magnetic ring 213 are N-poles. The magnetic pole at one end of the upper outer magnetic ring 222 close to the diaphragm 40 is an N-pole. The magnetic pole at one end of the upper inner magnetic ring 212 close to the diaphragm 40 is an S-pole. The magnetic pole at one end of the middle outer magnetic ring 223 close to the voice coil 30 is an S-pole. The magnetic pole at one end of the middle inner magnetic ring 213 close to the voice coil 30 is an N-pole.

Preferably, the upper inner magnetic ring 212, the middle inner magnetic ring 213, the lower inner magnetic ring 214, the upper outer magnetic ring 222, the middle outer magnetic ring 223 and the lower outer magnetic ring 224 are each configured as an integrally closed annular structure. The inner-ring magnetic circuit unit 21 and the outer-ring magnetic circuit unit 22 both have a structure in which the upper layer, the middle layer and the lower layer are all magnets. Compared with the traditional magnetic circuit, the magnetic circuit assembly 20 of the present application can provide greater magnetic field intensity, as measured.

In addition, in the magnetic circuit assembly 20, the inner-ring magnetic circuit unit 21 adopts a design in which the middle inner magnetic ring 213 is sandwiched between the upper inner magnetic ring 212 and the lower inner magnetic ring 214, the outer-ring magnetic circuit unit 22 adopts a design in which the outer magnetic ring 223 is sandwiched between the upper outer magnetic ring 222 and the lower outer magnetic ring 224. The upper inner magnetic ring 212, the lower inner magnetic ring 214, the upper outer magnetic ring 222 and the lower outer magnetic ring 224 are polarized axially, the middle inner magnetic ring 213 and the middle outer magnetic ring 223 are polarized radially, thereby further increasing the intensity of the magnetic field. In this way, axial magnet breakage during the polarization process can be avoided. In addition, the upper inner magnetic ring 212 and the lower inner magnetic ring 214 are designed to have a magnetic ring structure corresponding to the middle inner magnetic ring 213 in a one-to-one manner, which is more conducive to the assembly of the entire magnetic circuit system. Moreover, the middle inner magnetic ring 213 and the middle outer magnetic ring 223 that are adjacent to each other are axially polarized magnetic rings, which ensures less flux leakage as compared with a traditional structure using multiple segmented magnets, and there is no need to assemble the segmented magnets. It also solves the problem that the segmented magnets are not assembled smoothly and reduces the operation difficulty during production of loudspeakers.

Preferably, the upper inner magnetic ring 212, the middle inner magnetic ring 213, the lower inner magnetic ring 214, the upper outer magnetic ring 222, the middle outer magnetic ring 223 and the lower outer magnetic ring 224 are all NdFEB magnets. The NdFEB magnets have high magnetic properties. As practical magnets, they have the best magnetic properties in the creation of strong magnetic fields. The material brands of the NdFEB magnets are N35-N52.

Preferably, the remanence of the upper inner magnetic ring 212 and the remanence of the lower inner magnetic ring 214 are respectively less than the remanence of the middle inner magnetic ring 213, and the superimposed remanence of the upper inner magnetic ring 212 and the lower inner magnetic ring 214 is greater than the remanence of the middle inner magnetic ring 213. The remanence of the upper outer magnetic ring 222 and the remanence of the lower outer magnetic ring 224 are respectively less than the remanence of the middle outer magnetic ring 223, and the superimposed remanence of the upper outer magnetic ring 222 and the lower outer magnetic ring 224 is greater than the remanence of the middle outer magnetic ring 223. In this way, the magnetic conductivity characteristics of the middle magnetic rings are made full use to achieve high magnetic field intensity without increasing the sizes of the magnets and the loudspeaker.

The voice coil 30 is installed in the annular gap 23. The voice coil 30 comprises a hollow tube 31 and a winding (multiple turns of coils) 32 wound around the outer surface of the hollow tube 31. The winding 32 is located in the annular gap 23. Due to the design of the hollow tube and the winding, the large amplitude space requirement of the loudspeaker is ensured, the height of the winding 32 will not be too high, the weight of the voice coil 30 is reduced, and the loudspeaker has higher sensitivity.

The magnetic circuit of the miniature loudspeaker of the invention adopts an ironless design, in which the middle inner magnetic ring 213 and the middle outer magnetic ring 223 are used to replace T iron and washers of conventional magnets. The middle inner magnetic ring 213 and the middle outer magnetic ring 223 that both have a magnetic field direction can better guide the magnetic fields of the upper outer magnetic ring 222 and the lower outer magnetic ring 224 and the magnetic fields of the upper inner magnetic ring 212 and the lower inner magnetic ring 214 together, so that magnetic flux lines of the magnetic fields are more concentrated in the annular gap 23. Moreover, the ironless design can reduce the eddy current generated in the magnetic circuit, thereby increasing the BL value and sensitivity of the loudspeaker.

The diaphragm 40 is installed above the voice coil 30 and connected with a top of the hollow tube 31. Preferably, the winding 32 is located in the annular gap 23 between the middle inner magnetic ring 213 and the middle outer magnetic ring 223, and the height of the winding 32 is less than or equal to the thickness of the middle inner magnetic ring 213 and the middle outer magnetic ring 223. In this way, the radial magnetic circuit can effectively pass through the winding 32, thereby increasing the BL value of the loudspeaker and enhancing the sensitivity.

Figure 8:
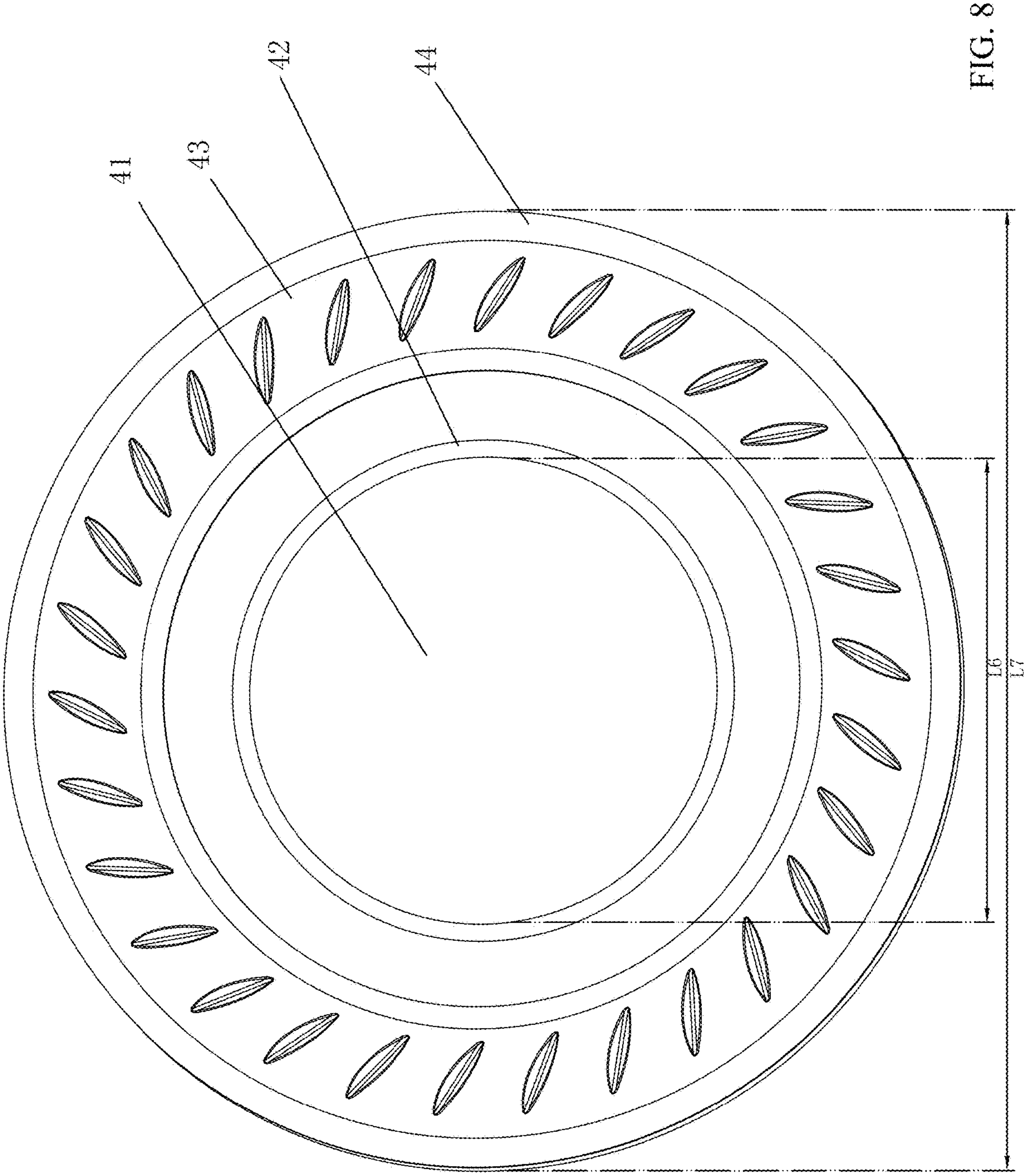
FIG. 8 illustrates a diaphragm of the loudspeaker of FIG. 1.

As shown in FIG. 8, the diaphragm 40 comprises a dome 41, a connecting portion 42, a folding ring 43, and an outer ring portion 44 that are connected in sequence from the inside to the outside. The voice coil 30 is connected to the connecting portion 42. The diaphragm 40 is fixed to the outer shell 10 by means of the outer ring portion 44. A ratio of an inner diameter L6 of the dome 41 to a diameter L7 of the diaphragm is between 50% and 60%, and a height L4 of the folding ring 43 is between 0.4 mm and 0.5 mm. Preferably, a height L5 of the dome is between 0.3 mm and 0.45 mm and not greater than the height of the folding ring. The dome 41 is made of a light and hard material such as a diamond-like carbon film, a liquid crystal polymer (LCP), graphene, fiber paper, thereby ensuring that the loudspeaker of the invention has good high-frequency extension, high sensitivity, better treble performance, and high sound pressure which is about 40% higher than the sound pressure of ordinary loudspeakers. Therefore, the loudspeaker has a resonant frequency of 180-250 Hz with a high frequency up to 30 KHz, thereby achieving a good sound effect at both a high frequency and a low frequency within a range of 20 Hz to 20 KHz. In addition, the folding ring 43, within this preferred height range, can reduce distortion and ensure a low resonant frequency of the loudspeaker. A folding ring with a height L4 less than 0.4 mm will cause too much distortion. A folding ring with a height L4 greater than 0.5 mm will cause a high resonant frequency and a poor sound effect at a low frequency.

Figure 5:
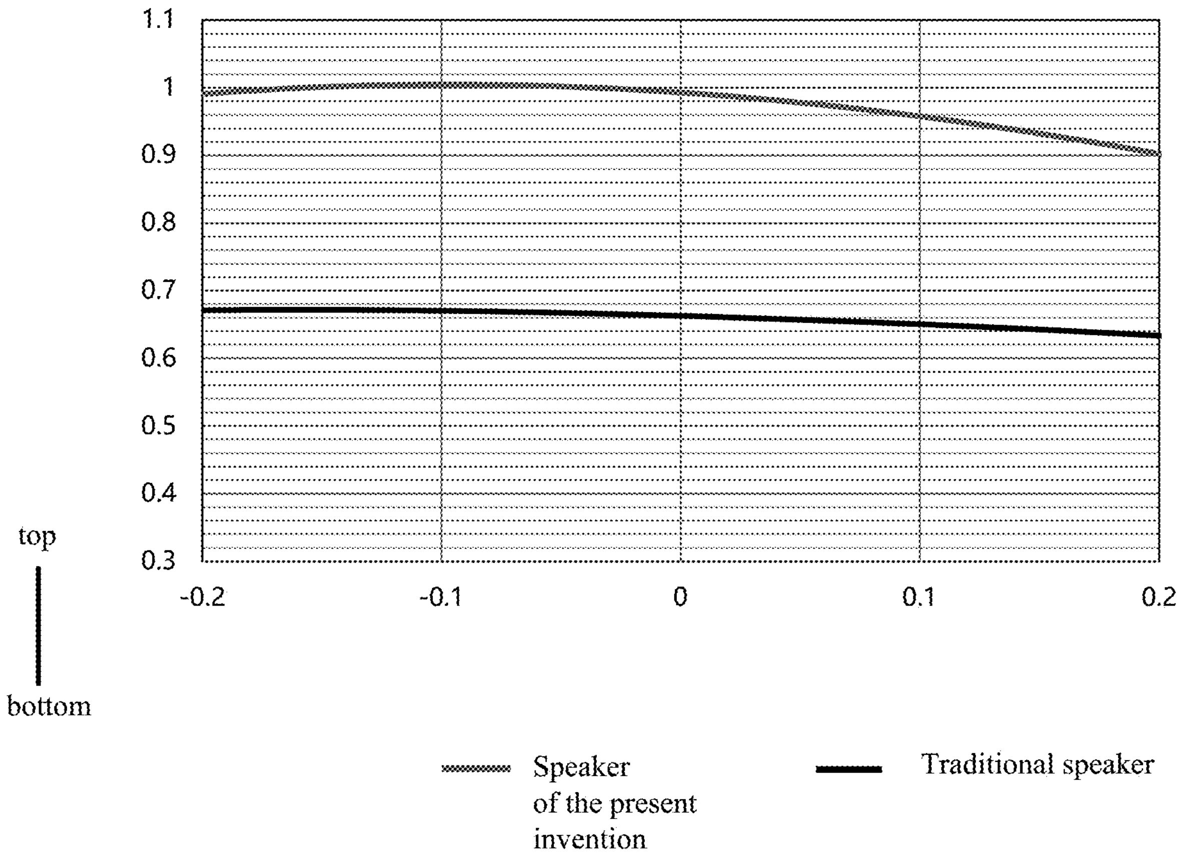
FIG. 5 is a comparison chart of simulated BL curves between the miniature loudspeaker with a radial ring magnetic circuit of the invention and a loudspeaker with a conventional magnetic circuit.
Figure 7:
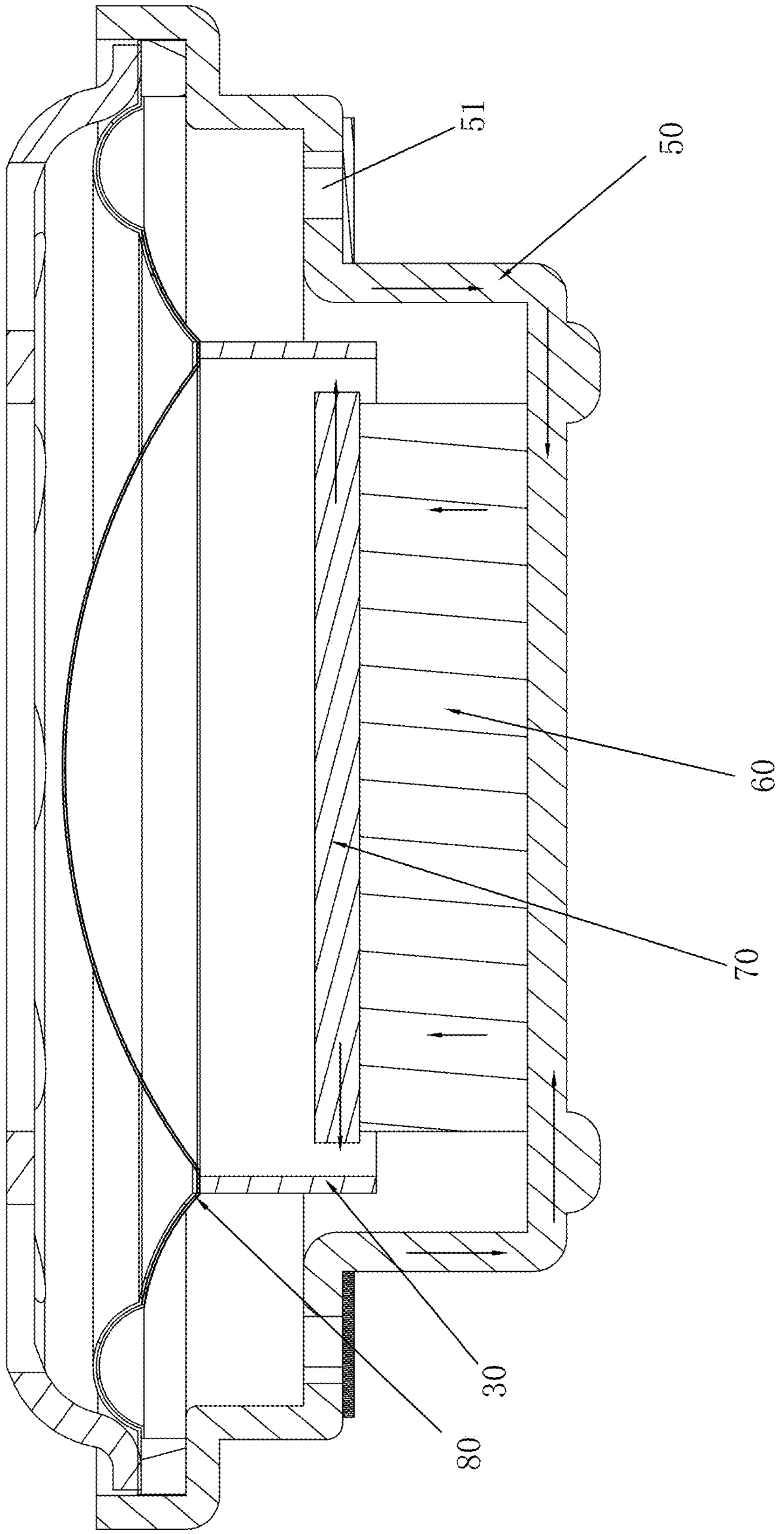
FIG. 7 is a cross-sectional view of a loudspeaker with a conventional magnetic circuit.

As shown in FIG. 5, it is a comparison chart of tested BL curves between the miniature loudspeaker of the present invention and a loudspeaker with a conventional magnetic circuit as shown in FIG. 7. In FIG. 5, the upper curve is the tested BL curve of the miniature loudspeaker of the invention, and the other curve is the tested BL curve of the loudspeaker with a conventional magnetic circuit. As shown in FIG. 5, the test BL of the miniature loudspeaker with a radial ring magnetic circuit of the invention is more than 40% higher than the tested BL of the loudspeaker with a conventional magnetic circuit in FIG. 7.

Figure 6:
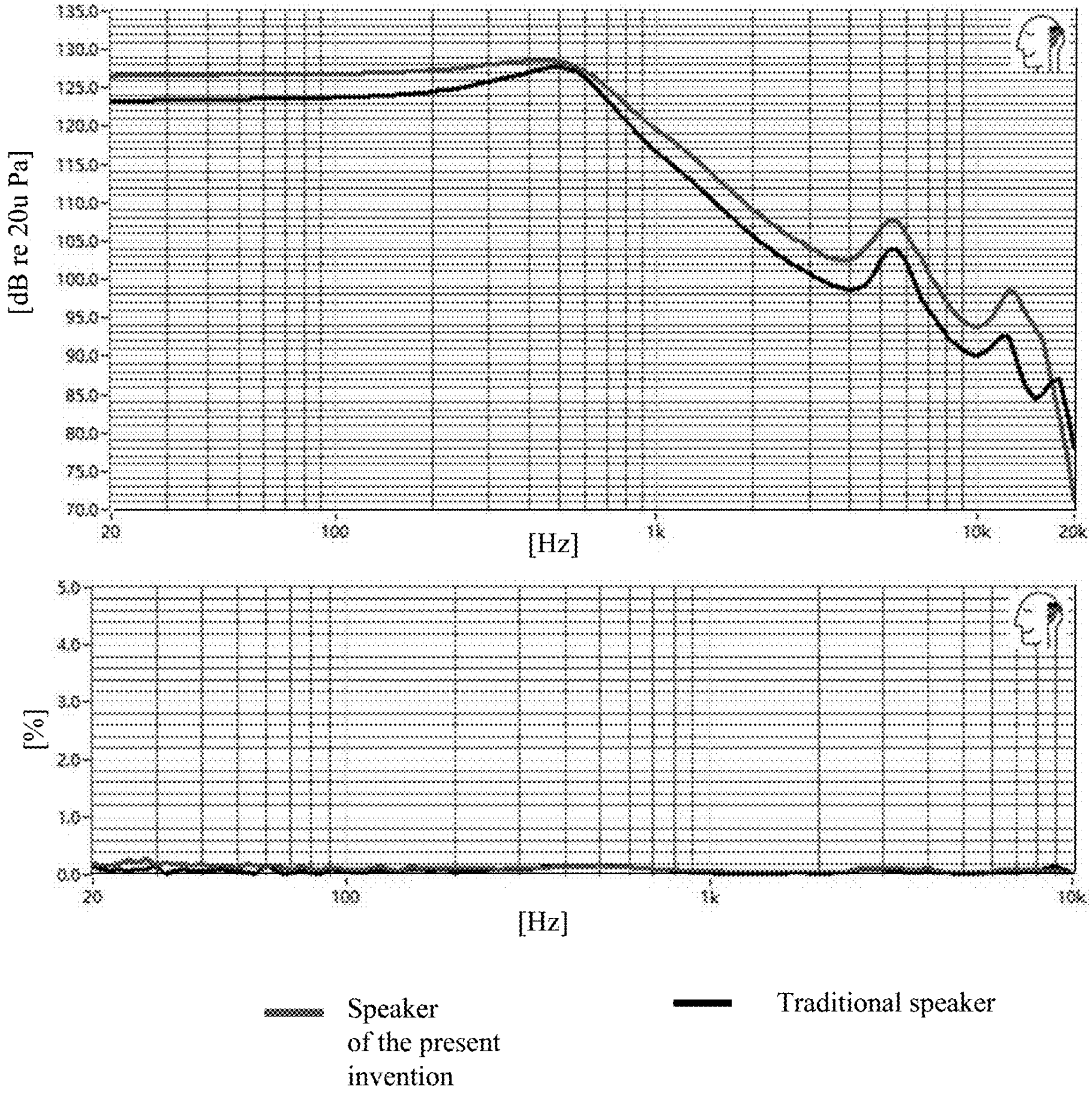
FIG. 6 is a comparison chart of frequency response curves between the miniature loudspeaker with a radial ring magnetic circuit of the invention and a loudspeaker with a conventional magnetic circuit.

As shown in FIG. 6, it is a comparison chart of frequency response curves between the miniature loudspeaker with a radial ring magnetic circuit of the invention and the loudspeaker with a conventional magnetic circuit in FIG. 7. Test conditions for comparison of the frequency response curves between the miniature loudspeaker with a radial ring magnetic circuit of the invention and the loudspeaker with a conventional magnetic circuit in FIG. 7 are as follows:

A power of 1 mW is applied to the loudspeakers, and an IEC711 artificial car is used; the same test fixture is used to match the IEC711 artificial car for testing; the loudspeakers have the same outer diameter of 13.6 mm, the same magnet brand of N52, the same outer diameter of the outer-ring magnetic circuit (d5=10.15 mm), the same outer diameter of the inner-ring magnetic circuit (d4=5.95 mm), and the annular gap 23 with the same width of 0.675 mm, and the wall thickness d1 of the outer-ring magnetic circuit is equal to the wall thickness d2 of the inner-ring magnetic circuit (d1=d2=1.425 mm). In FIG. 6, the upper curve is the frequency response curve of the miniature speaker with a radial ring magnetic circuit of the invention, and the other curve is the frequency response curve of the loudspeaker with a conventional magnetic circuit. Among loudspeakers with the same outer diameter size, the Y-axis value of the miniature speaker with a radial ring magnetic circuit of the invention is higher than that of the loudspeaker with a conventional magnetic circuit, and the sensitivity of the miniature speaker with a radial ring magnetic circuit of the invention is higher than that of the loudspeaker with a conventional magnetic circuit, thereby producing a good sound effect.

The invention comprises the following important features: the inner-ring magnetic circuit and the outer-ring magnetic circuit cooperatively form a radial ring magnetic circuit, the winding of the voice coil extends into the annular gap between the inner-ring magnetic circuit and the outer-ring magnetic circuit, the circumferential tuning holes are connected to the annular gap and directly face the annular gap to form a tuning channel; the hollow channel of the positioning column directly faces the diaphragm and forms another tuning channel together with the diaphragm. The tuning channels are respectively formed in the positioning column on which the inner-ring magnetic circuit is sleeved and in a position corresponding to the annular gap between the inner-ring magnetic circuit and the outer-ring magnetic circuit. In this way, among loudspeakers with the same outer diameter, the sizes of the magnetic circuit and the voice coil can be enlarged effectively, the BL value of the loudspeaker is increased, and the frequency response characteristics are improved, thereby improving the sensitivity of the loudspeaker and producing a good sound effect.

In addition, the voice coil is connected to the connecting portion of the diaphragm, and the diaphragm is fixed to the outer shell by means of the outer ring portion; the ratio of the inner diameter of the dome to the inner diameter of the diaphragm is between 50% and 60%, and the height of the folding ring is between 0.4 mm and 0.5 mm. In this way, the loudspeaker has a resonant frequency of 180-250 Hz with a high frequency up to 30 KHz, thereby achieving a good sound effect at both a high frequency and a low frequency within a range of 20 Hz to 20 KHz.

The above are only preferred embodiments of the invention and do not limit the technical scope of the invention in any way. Therefore, any minor amendments, equivalent changes and modifications made to the above embodiments according to the technical essence of the invention will still fall within the scope of the technical solution of the invention.

What is claimed is:

1. A miniature loudspeaker, comprising an outer shell, a magnetic circuit assembly, a voice coil and a diaphragm, the outer shell comprising a bottom and an outer ring wall, the bottom and the outer ring wall cooperatively forming a receiving cavity, the diaphragm, the voice coil and the magnetic circuit assembly being installed in the receiving cavity of the outer shell;

wherein the diaphragm comprises a dome, a connecting portion, a folding ring, and an outer ring portion that are connected in sequence from an inside to an outside, the voice coil is connected to the connecting portion, the diaphragm is fixed to the outer shell by means of the outer ring portion, a ratio of an inner diameter of the dome to an inner diameter of the diaphragm is between 50% and 60%, and a height of the folding ring is between 0.4 mm and 0.5 mm;

wherein the bottom of the outer shell is provided with a positioning column that protrudes upward and is located in the receiving cavity; the positioning column is provided with a hollow channel, a hollow tuning hole is provided at the bottom of the outer shell corresponding to the hollow channel, the hollow tuning hole is in communication with the hollow channel, a plurality of circumferential tuning holes are provided at the bottom of the outer shell along an outer periphery of the hollow tuning hole and penetrate the bottom of the outer shell;

wherein the magnetic circuit assembly comprises an inner-ring magnetic circuit unit and an outer-ring magnetic circuit unit, the inner-ring magnetic circuit unit has an inner-ring hole, the outer-ring magnetic circuit has an outer-ring hole, the inner-ring magnetic circuit unit is sleeved on the positioning column through the inner-ring hole, the outer-ring magnetic circuit is sleeved outside the inner-ring magnetic circuit unit through the outer-ring hole, and an annular gap is formed between an outer wall of the inner-ring magnetic circuit unit and an inner wall of the outer-ring magnetic circuit;

wherein the inner-ring magnetic circuit unit comprises an upper inner magnetic ring, a middle inner magnetic ring and a lower inner magnetic ring that are stacked up in sequence; the outer-ring magnetic circuit unit comprises an upper outer magnetic ring, a middle outer magnetic ring and a lower outer magnetic ring that are stacked up in sequence; the upper inner magnetic ring, the lower inner magnetic ring, the upper outer magnetic ring and the lower outer magnetic ring are polarized axially; and the middle inner magnetic ring and the middle outer magnetic ring are radially polarized;

wherein the upper outer magnetic ring, the upper inner magnetic ring, the middle inner magnetic ring, and the middle outer magnetic ring form a closed magnetic circuit, the lower outer magnetic ring, the lower inner magnetic ring, the middle inner magnetic ring and the middle outer magnetic ring form another closed magnetic circuit; the circumferential tuning holes in communication with the annular gap directly face the annular gap to form tuning channels; and wherein the voice coil is installed in the annular gap; the voice coil comprises a hollow tube and a winding wound around the hollow tube; the winding is located in the annular gap; the diaphragm is installed above the voice coil and connected with a top of the hollow tube; and the hollow channel directly faces the diaphragm and forms another tuning channel together with the diaphragm.

2. The miniature loudspeaker according to claim 1, wherein the winding is located in a portion of the annular gap between the middle inner magnetic ring and the middle outer magnetic ring, and a height of the winding is less than or equal to thicknesses of the middle inner magnetic ring and the middle outer magnetic ring.

3. The miniature loudspeaker according to claim 1, wherein polarities of magnetic poles at one ends of the upper outer magnetic ring and the lower outer magnetic ring close to the middle outer magnetic ring are the same;

polarities of magnetic poles at one ends of the upper inner magnetic ring and the lower inner magnetic ring close to the middle inner magnetic ring are the same;

polarities of magnetic poles at one ends of the upper outer magnetic ring and the upper inner magnetic ring close to the diaphragm are reverse to each other;

polarities of magnetic poles at one ends of the middle outer magnetic ring and the middle inner magnetic ring close to the voice coil are reverse to each other; and a polarity of a magnetic pole at one end of the upper outer magnetic ring close to the diaphragm is reverse to a polarity of a magnetic pole at one end of the middle outer magnetic ring close to the voice coil.

4. The miniature loudspeaker according to claim 1, wherein the upper inner magnetic ring, the middle inner magnetic ring, and the lower inner magnetic ring are configured as an integrally closed annular structure; and the upper outer magnetic ring, the middle outer magnetic ring and the lower outer magnetic ring are configured as an integrally closed annular structure.

5. The miniature loudspeaker according to claim 1, wherein a remanence of the upper inner magnetic ring and a remanence of the lower inner magnetic ring are respectively less than a remanence of the middle inner magnetic ring, and a superimposed remanence of the upper inner magnetic ring and the lower inner magnetic ring is greater than the remanence of the middle inner magnetic ring; and a remanence of the upper outer magnetic ring and a remanence of the lower outer magnetic ring are respectively less than the remanence of the middle outer magnetic ring, and a superimposed remanence of the upper outer magnetic ring and the lower outer magnetic ring is greater than the remanence of the middle outer magnetic ring.

6. The miniature loudspeaker according to claim 1, wherein the outer shell is provided with a solder pad, and the outer shell is formed by integrally injection-molding with the solder pad.

7. The miniature loudspeaker according to claim 1, wherein the annular gap has a radial width of 0.4 mm-1.0 mm.

8. The miniature loudspeaker according to claim 1, wherein an inner diameter of the inner-ring magnetic circuit unit ranges from 2.5 mm to 3.5 mm.

9. The miniature loudspeaker according to claim 1, wherein a first tuning mesh is provided at the bottom of the outer shell corresponding to the hollow tuning hole; and a second tuning mesh is provided at the bottom of the outer shell corresponding to each of the circumferential toning holes.

10. The miniature loudspeaker according to claim 1, wherein a ratio of a radial thickness of the inner-ring magnetic circuit unit to a radial thickness of the outer-ring magnetic circuit unit is between ⅔ and 1.

* * * * *